US011210638B2

(12) United States Patent
Cui et al.

(10) Patent No.: US 11,210,638 B2
(45) Date of Patent: Dec. 28, 2021

(54) SYSTEMS AND METHODS FOR PROVIDING CONTEXTUAL CALENDAR REMINDERS

(71) Applicant: AIRBNB, INC., San Francisco, CA (US)

(72) Inventors: Tao Cui, San Francisco, CA (US); Yuting Gu, Mountain View, CA (US)

(73) Assignee: Airbnb, Inc., San Francisco, CA (US)

( * ) Notice: Subject to any disclaimer, the term of this patent is extended or adjusted under 35 U.S.C. 154(b) by 515 days.

(21) Appl. No.: 15/844,971

(22) Filed: Dec. 18, 2017

(65) Prior Publication Data

US 2019/0188644 A1    Jun. 20, 2019

(51) Int. Cl.
    *G06Q 10/10*    (2012.01)
    *G06Q 10/02*    (2012.01)
    *G06Q 50/16*    (2012.01)

(52) U.S. Cl.
    CPC .......... *G06Q 10/109* (2013.01); *G06Q 10/02* (2013.01); *G06Q 50/163* (2013.01)

(58) Field of Classification Search
    CPC .......................... G06Q 10/02; G06Q 10/109
    See application file for complete search history.

(56) References Cited

U.S. PATENT DOCUMENTS

| 7,359,943 | B2 | 4/2008 | Thakkar et al. |
| 7,848,966 | B2 | 12/2010 | Charuk et al. |
| RE43,068 | E | 1/2012 | Woodard et al. |
| 8,671,009 | B1 | 3/2014 | Coley et al. |
| 9,811,785 | B1 | 11/2017 | Bion et al. |
| 2003/0220807 | A1 | 11/2003 | Hoffman et al. |
| 2008/0133287 | A1 | 6/2008 | Slattery |
| 2009/0070178 | A1 | 3/2009 | Gilbert |
| 2014/0206328 | A1* | 7/2014 | Varoglu ............... G06Q 10/109 455/418 |
| 2014/0278548 | A1* | 9/2014 | Munro ................ G06F 19/3418 705/3 |
| 2014/0278591 | A1* | 9/2014 | Blecharczyk .......... G06Q 10/02 705/5 |

(Continued)

OTHER PUBLICATIONS

Jourdan et al., "Interfaces That Learn: A Learning Apprentice for Calendar Management", Machine Learning Methods for Planning, pp. 31-65 (Year: 1993).*

(Continued)

*Primary Examiner* — Emmett K. Walsh
(74) *Attorney, Agent, or Firm* — Maynard Cooper & Gale, P.C.; Brian T. Sattizahn, Esq.

(57) ABSTRACT

Systems and methods for providing contextual calendar reminders are provided. A host can receive a calendar reminder notifying the host that a calendar for a property listing maintained by the host may need to be updated. The system can provide the host with a reminder to update the calendar for the property listing based on criteria related to the expected number of times the host will view the calendar within a designated time period and the timing of the host's last interaction with the calendar. If the designated criteria are satisfied, the system can generate a reminder for the host to update the calendar for the property listing. Before sending the reminder to the host, the system confirms that the host did not recently interact with the calendar and if the host did interact with the calendar, the system cancels the sending of the reminder.

24 Claims, 12 Drawing Sheets

(56) References Cited

U.S. PATENT DOCUMENTS

| | | | |
|---|---|---|---|
| 2014/0358842 A1* | 12/2014 | Flinn | G06F 16/24575 |
| | | | 706/52 |
| 2015/0161546 A1* | 6/2015 | Stoyanov | G06Q 10/06316 |
| | | | 705/7.26 |
| 2015/0206258 A1 | 7/2015 | Charkov et al. | |
| 2016/0098649 A1 | 4/2016 | Ifrach et al. | |
| 2016/0148237 A1 | 5/2016 | Ifrach et al. | |
| 2016/0343049 A1* | 11/2016 | Nair | G06Q 30/0601 |
| 2017/0046376 A1* | 2/2017 | Yang | G06F 16/2365 |
| 2017/0048396 A1 | 2/2017 | O'Connor et al. | |
| 2017/0118348 A1 | 4/2017 | Dotan-Cohen et al. | |
| 2017/0178036 A1 | 6/2017 | Xu et al. | |
| 2017/0193083 A1* | 7/2017 | Bhatt | G06F 16/313 |

OTHER PUBLICATIONS

"Deep Learning, NLP, and Representations," http://colah.github.io/posts/2014-07-NLP-RNNs-Representations/, Jul. 7, 2014, 12 pages.

* cited by examiner

SYSTEMS AND METHODS FOR PROVIDING CONTEXTUAL CALENDAR REMINDERS

BACKGROUND

Online reservation systems typically provide listings of properties, such as houses, condominiums, rooms, apartments, lots, and other real estate, that a user (referred to hereafter as a "guest") may reserve for a specified time period (e.g., a day, week, month, or other period of interest). As an example, when a guest is planning a vacation or other type of trip, the guest may use an online reservation system to search property listings in order to find properties of interest for renting during the trip. When the guest is searching for properties, one of the search criteria typically used by the guest is the dates when the property is needed by the guest.

Each property listed in the online reservation system has a calendar associated with the property. The calendar is used to determine the availability of the property (i.e., when the guest may stay at the property). When a guest makes a reservation for a particular property, sometimes referred to as a "booking," the corresponding calendar for the property is updated to reflect that the property is no longer available for reservation on those dates. In addition, the owner of the property (referred to hereafter as a "host") can access the calendar and indicate days when the property is not available for reservation or rental by guests.

If the host doesn't update the calendar to indicate the days when the property is not available for rental, the reservation system can include the property in the search results provided to a guest. The guest can then attempt to reserve the property for dates that the property is not actually available for reservation. In response to the guest's attempted reservation of the property for dates when the property is not available, the host has to then either refuse the reservation or cancel the reservation. The refusal or cancellation of a guest's reservation can increase guest frustration, as well as reduce the likelihood that the guest will use the reservation system for a future reservation.

A heretofore unaddressed need exists in the art for providing reminders to hosts to update the corresponding calendars for the host's properties so that guests can be more confident regarding the availability of property listings of interest.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure.

DETAILED DESCRIPTION

Figure 1:
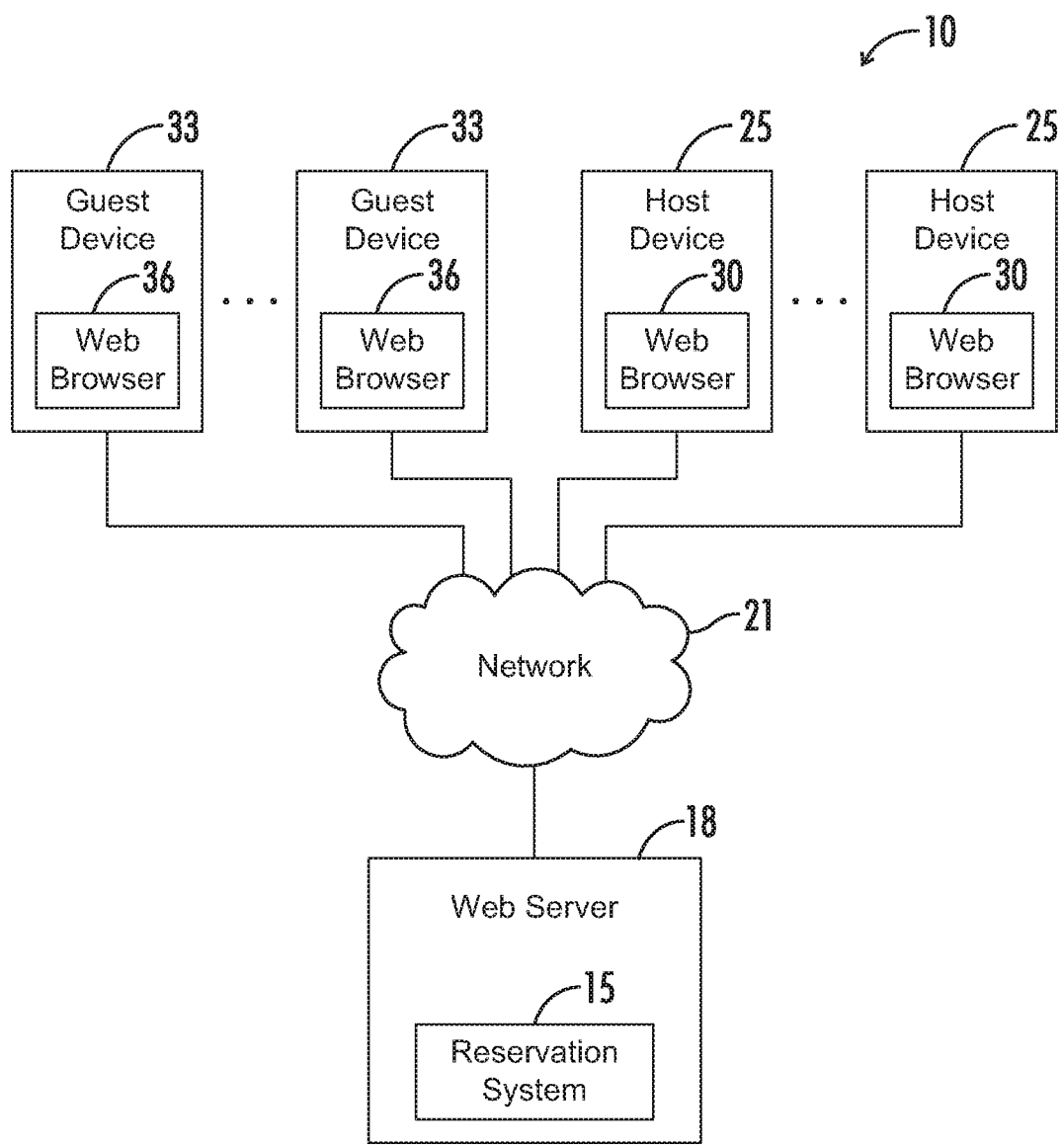
FIG. 1 is a block diagram illustrating a communication system in accordance with some embodiments of the present disclosure.

The present disclosure generally pertains to a system that provides contextual reminders to a user that interacts with and/or maintains information in the system. For example, the present disclosure can be implemented as a reservation system that provides contextual calendar reminders to a host that maintains a property listing in the reservation system. The calendar reminders are sent to the host to remind the host to update the calendar for the property listing in the reservation system. The reservation system uses the calendar for the property listing when determining if a property is available for a reservation by a guest. An out-of-date calendar for a property listing can result in a guest making reservations that have to be refused or cancelled by the host. A refused or cancelled reservation by the host is undesirable for a variety of reasons (e.g., lost revenue or bad experience for the guest). To avoid the lost revenue and other consequences from refusing or cancelling a reservation (e.g., a lowering of the property listing in subsequent search results), many hosts (e.g., about 25%) have requested the operators of the reservation system remind them to block their calendars when they are not available to host. Thus, the reservation system can provide the host with appropriately timed reminders such that the host maintains a substantially up-to-date calendar, but is not overwhelmed with excessive reminders such that the host unsubscribes or opts out from receiving calendar reminders to update his or her calendar.

The reservation system can include calendar logic that is used to send a calendar reminder to the host. The calendar logic can use machine learning techniques (e.g., a decision tree machine learning model) to identify hosts to receive calendar reminders based on the expected number of calendar interactions by that host for a predetermined period (e.g., 60 days) in the future. The expected number of calendar interactions can be compared to a preselected threshold that is based on the actual and/or projected reservation activity (e.g., number of reservations or booking probability) for the property listing. Based on the comparison, the calendar logic can decide if the host should receive a calendar reminder. However, before a calendar reminder is generated, the calendar logic also determines if it is an appropriate time to send a calendar reminder to the identified host. The calendar logic can store information on each interaction the host has with a calendar for a property listing and use the information regarding the host's interactions with the calendar to determine when to send the host a reminder. The calendar logic can determine that an identified host is to receive a reminder once a parameter relating to the host's interaction with the calendar exceeds a threshold value. In response to the determination that an identified host is to receive a reminder, the calendar logic can generate the reminder for the host. However, before the reminder is sent to the host, the calendar logic performs a check to make sure that the host did not interact with the calendar while the reminder was being generated.

FIG. 1 depicts a communication system 10 in accordance with some embodiments of the present disclosure. As shown by FIG. 1, a reservation system 15 may be implemented within a web server 18 or other type of device or system that is coupled to a network 21. The network 21 can be the Internet and use transmission control protocol/Internet protocol (TCP/IP) for communication in an embodiment. However, in other embodiments, the network 21 may be an Intranet, a local area network (LAN), a wide area network (WAN), or any other type of communication network using one or more communication protocols.

As shown by FIG. 1, the communication system 10 may include a plurality of host devices 25 that may be used by certain users (referred to herein as "hosts") to create, modify, or otherwise manage property listings stored at the web server 18. Each host device 25 may be implemented by one or more computing devices, such a desktop computer, laptop computer, or hand-held computer (e.g., a smartphone) for receiving, processing, and outputting information. As shown by FIG. 1, each host device 25 may store a web browser 30 that can be used to communicate with the web server 18 via the network 21 (e.g., the Internet). In this regard, the reservation system 15 of the web server 18 may provide one or more web pages or other web content that is displayed by the host device 25 and used by a host to manage at least one property listing that is stored and processed by the reservation system 15. In other embodiments, the host device 25 may store an application for accessing the reservation system 15 of the web server 18 without the use of a web browser 30.

The communication system 10 may also include a plurality of guest devices 33 that may be used by guests to access the reservation system 15 of the web server 18 to request property listing searches, review the results of such searches, and select one or more property listings for bookings. Each guest device 33 may be implemented by one or more computing devices, such a desktop computer, laptop computer, or hand-held computer (e.g., a smartphone) for receiving, processing, and outputting information. As shown by FIG. 1, each guest device 33 may store a web browser 36 that can be used to communicate with the web server 18 via the network 21 (e.g., the Internet). In this regard, the reservation system 15 of the web server 18 may provide one or more web pages or other web content that is displayed by the guest device 33 and used by a guest to search, review, and select property listings stored and processed by the reservation system 15. In other embodiments, the guest device 33 may store an application for accessing the reservation system 15 of the web server 18 without the use of a web browser 30.

Figure 2:
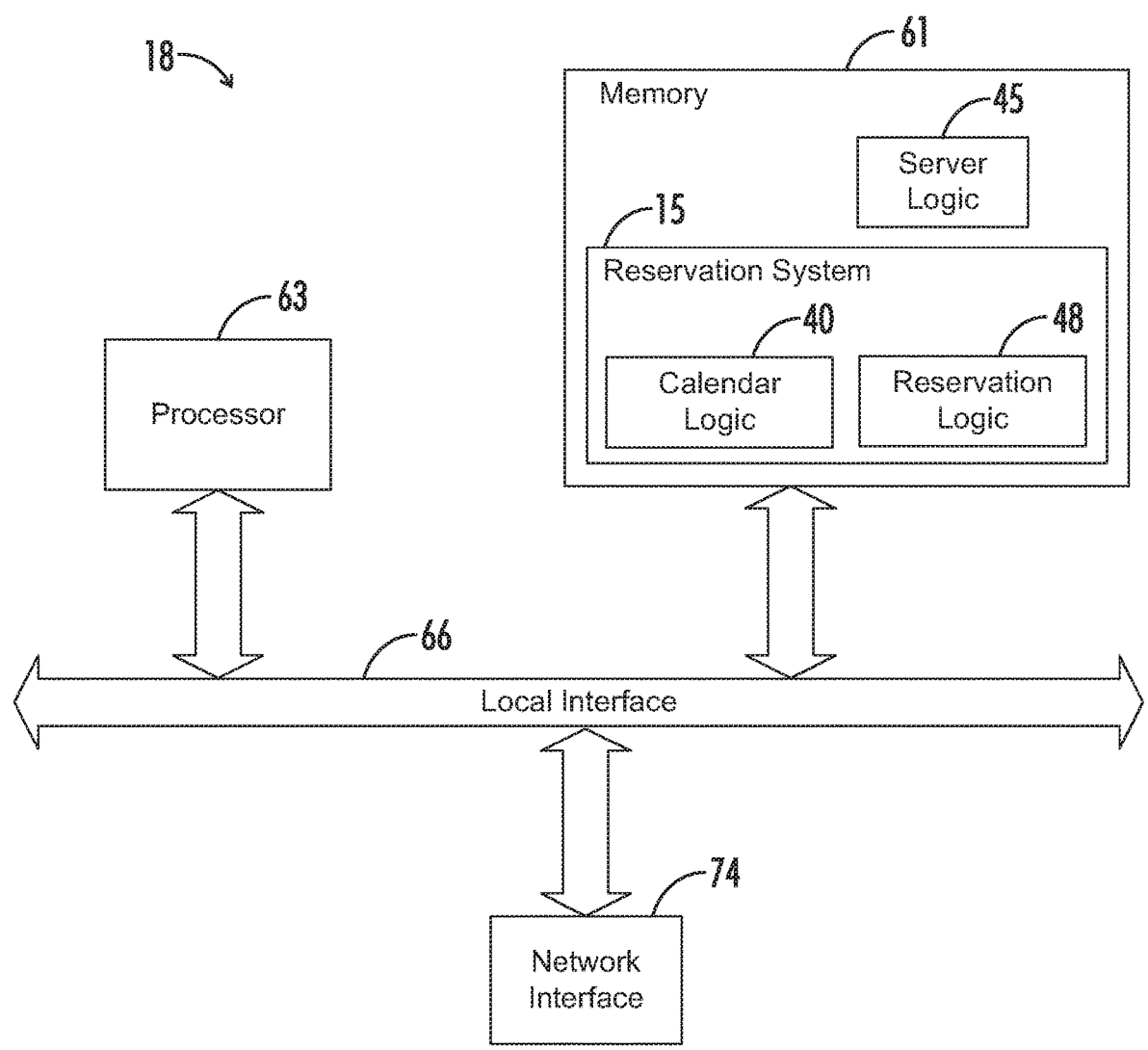
FIG. 2 is a block diagram illustrating a web server from the communication system of FIG. 1 in accordance with some embodiments of the present disclosure.

FIG. 2 depicts a web server 18 in accordance with some embodiments of the present disclosure. The web server 18 can include logic 45, referred to herein as "server logic," for generally controlling the operation of the web server 18, including communicating with the host device 30 and the guest devices 33 of the communication system 10. As shown by FIG. 2, the web server 18 may include a reservation system 15 having reservation logic 48 and calendar logic 40 for performing certain functions, as will be described in more detail hereafter.

The server logic 45, the reservation logic 48 and the calendar logic 40 can be implemented in software, hardware, firmware or any combination thereof. In the web server 18 shown in FIG. 2, the server logic 45, the reservation logic 48 and the calendar logic 40 are implemented in software and stored in memory 61 of the web server 18. Note that the server logic 45, the reservation logic 48 and the calendar logic 40, when implemented in software, can be stored and transported on any non-transitory computer-readable medium for use by or in connection with an instruction execution apparatus (e.g., a microprocessor) that can fetch and execute instructions. In the context of this disclosure, a "computer-readable medium" can be any device or system that can contain or store a computer program for use by or in connection with an instruction execution apparatus.

The web server 18 depicted by FIG. 2 includes at least one conventional processor 63, which has processing hardware for executing instructions stored in memory 61. As an example, the processing unit 110 may include a digital signal processor or a central processing unit (CPU). The processor 63 communicates to and drives the other elements within the web server 18 via a local interface 66, which can include at least one bus. Furthermore, the web server 18 may have a network interface 74, such as one or more modems, for exchanging data with the network 21. As an example, when the reservation logic 48 and the calendar logic 40 are implemented in software, the processor 63 may execute such software as may be desired to implement the functionality of the reservation logic 48 and the calendar logic 40 described herein.

Figure 3:
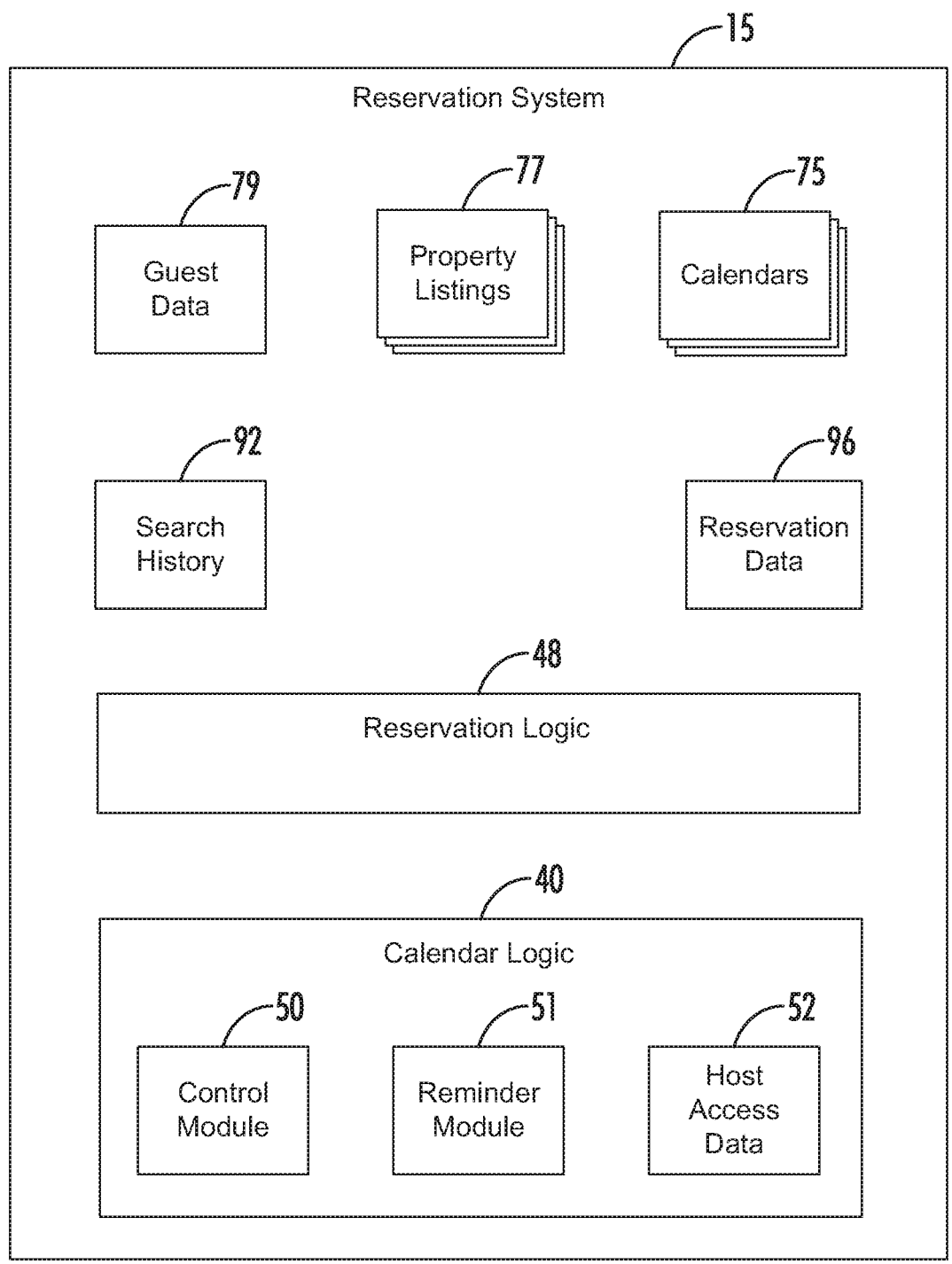
FIG. 3 is a block diagram illustrating a reservation system in accordance with some embodiments of the present disclosure.

As shown by FIG. 3, the reservation system 15 may include a plurality of property listings 77, which may be stored in the memory 61 of the web server 18. In one embodiment, the property listings 77 may be stored in a database (not specifically shown) such that the property listings 77 can be searched and manipulated using different criteria. Each property listing 77 may be associated with a property (e.g., a house, condominium, room, apartment, lot, or other real estate asset) available for renting or leasing by a host. Each property listing 77 includes information about the associated property that may be used by guests in deciding whether to book a reservation for the property. In addition, each property listing 77 has a corresponding calendar 75 that can be used to indicate the availability of the property. While the calendars 75 are shown separate from the property listings 77 in the embodiment of FIG. 3, the calendars 75 may be integrated within the property listings 77 in other embodiments.

The reservation system 15 can also include reservation logic 48, guest data 79, reservation data 96, search history information 92, and calendar logic 40. The reservation logic 48 can be generally configured to control the general operation of the reservation system 15, including responding to and tracking inputs from guests. The guest data 79 defines information associated with each guest that has registered with the reservation system 15. Reservation data 96 can include data indicative of the reservations made by guests and can be maintained by the reservation logic 48. In one embodiment, the reservation logic 48 can update the reservation data 96 only after the host of a property listing 77 agrees to the reservation by the guest. The search history information 92 may store information relating to search queries submitted by a guest and property listings 77 that have been selected by the guest from a search results list. Additional information regarding the operation of the reservation system 15 and reservation logic 48 can be located in U.S. patent application Ser. No. 15/789,622, filed on Oct. 20, 2017, and titled "Systems and Methods for Searching Property Listings," which application is hereby incorporated by reference into this disclosure in its entirety.

In some embodiments, as shown by FIG. 3, the calendar logic 40 may include a control module 50, a reminder module 51, and host access data 52. As will be described in more detail hereafter, the control module 50 is generally configured to control the operation of the calendar logic 40, including updating the calendars 75 based on information obtained from reservation data 96 or from the host. The reminder module 51 is configured to determine when a host is to receive a reminder to update the calendars 75 for his or her property listings 77 and the host access data 52 can store information regarding the accessing of a calendar 75 by the host.

In one embodiment, the control module 50 can access the reservation data 96 to extract information regarding a reservation made by a guest. The control module 50 can extract information such as the property listing 77 and the dates of the reservation from the reservation data 96. The control module 50 can then update the calendar 75 for the property listing 77, based on the data obtained from the reservation data 96, to indicate in the calendar 75 that the property listing 77 is not available for a booking by a different guest during the dates of the reservation.

In addition, the control module 50 can provide an interface to a host to permit the host to access and modify the calendar(s) 75 for the property listing(s) 77 maintained by the host. In one embodiment, the control module 50 can display a graphical user interface, such as an interactive calendar, in the web browser 30 of the host device 25. For example, if a host knows that there are particular days when a property listing 77 is not available for a booking, such as when the host is travelling away from the property, the host can access the calendar 75 for the property listing 77 via the interface provided by the control module 50 and update the calendar 75 to reflect that the property listing 77 is not available on those days. The control module 50 can also update the host access data 52 to indicate that the host accessed and modified the calendar 75 for the property listing 77. In one embodiment, the host access data 52 can store information (e.g., date, length of time, changes, etc.) regarding the access to the calendar 75 by the host.

The reminder module 51 may be configured to determine hosts who should receive a reminder to update their corresponding calendars 75 and then send the reminders to the hosts. The reminder module 51 can selectively choose hosts to receive reminders based on different strategies as described in detail below. A first strategy can have the reminder module 51 provide regular reminders (e.g., weekly reminders) to hosts. For example, the first strategy may be used for new hosts to help the new hosts develop a habit of frequently updating their calendars 75. A second strategy can have the reminder module 51 provide "smart" reminders to hosts based on how often each host typically checks his/her calendar. For example, the second strategy may be used for experienced hosts that are not diligent in updating their calendars 75 based on criteria established by the reminder module 51. Once the reminder module 51 has identified the hosts to receive reminders to update their calendars 75 using one or more of the above strategies, the reminder module 51 can then facilitate the process of generating the appropriate reminder email for the hosts. In other embodiments, other techniques for determining when to send reminders are possible.

In some embodiments, the reminder module 51 may use a machine learning algorithm to analyze the host interactions with the calendars 75 and determine host tendency parameters based on such interactions. As known in the art, machine learning algorithms generally involve training a computer through the use of artificial intelligence by analyzing sample data sets to recognize data patterns that likely result in certain outputs or outcomes. Such machine learning algorithms may be used by the reminder module 51 to learn tendencies regarding host interactions with the calendars 75 in order to determine an appropriate time to remind the host to update his or her calendars 75. For example, the machine learning algorithm may learn host tendencies regarding the frequency of interactions with the calendar 75 (e.g., weekly), when interactions with the calendar 75 occur (e.g., end of the week), and how much of the calendar 75 is updated during an interaction (e.g., 2 months). Yet other techniques for identifying host tendencies based on host interactions with the calendars 75 and determining the host tendency parameters are possible in other embodiments.

Figure 4:
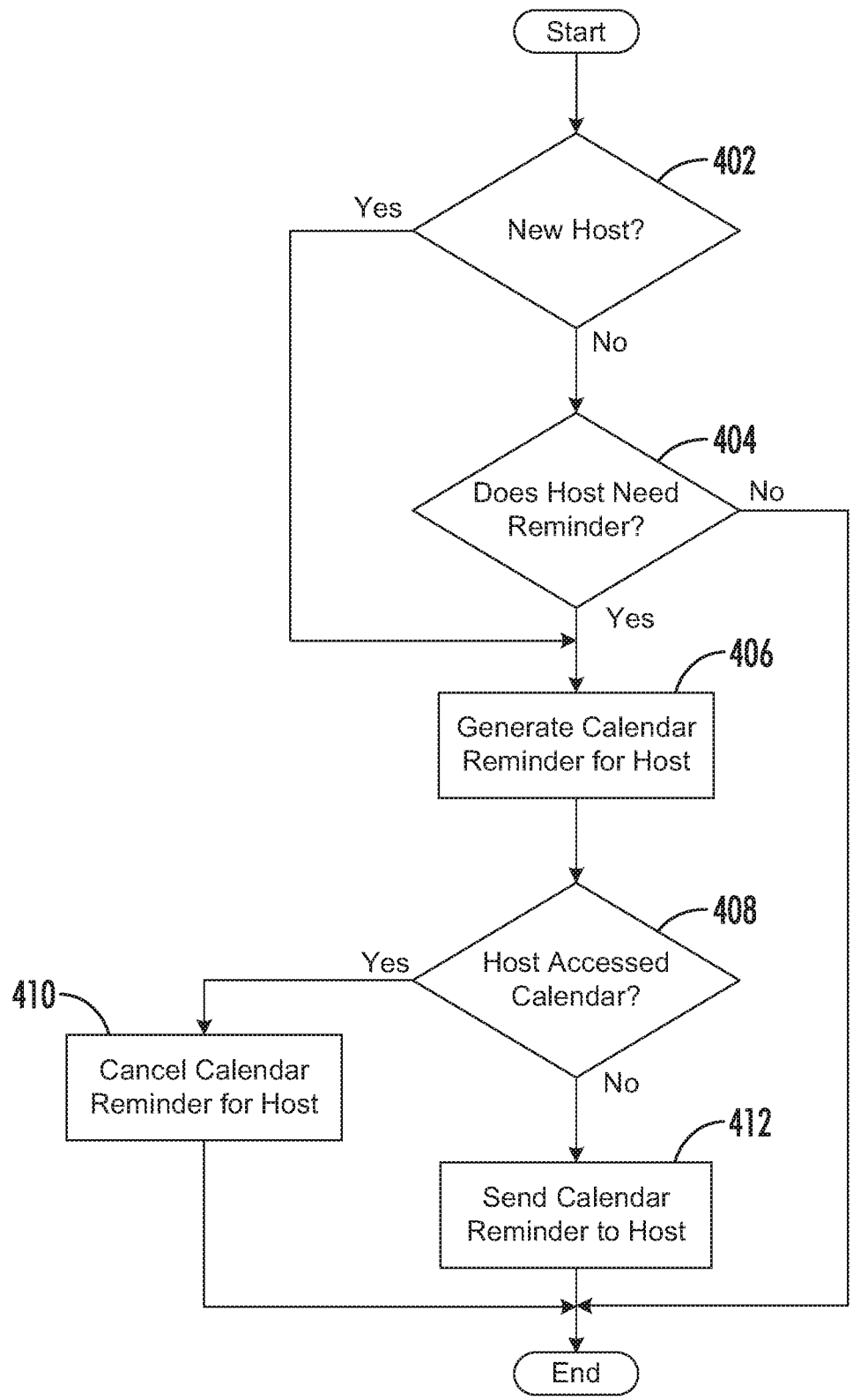
FIG. 4 is a flow chart illustrating a method for sending a calendar reminder to a host in accordance with some embodiments of the present disclosure.

FIG. 4 shows an embodiment of a process for identifying hosts to receive reminders to update their calendars 75 and then sending the reminders to the hosts. The operations depicted and described in FIG. 4 may be automatically completed by the reminder module 51 and/or the calendar logic 40 using the host access data 52 and other information stored in memory 61. It will be understood that the steps of FIG. 4 are provided as exemplary steps, and that one or more steps may be removed or added, and that the order of steps may be modified. In one embodiment, the process of FIG. 4 can be automatically performed at a predetermined interval (e.g., once a week), but may also be performed in response to a user input to the reservation system 15 or to other initiating criteria in other embodiments.

The process begins by determining if the host is a new host (step 402). In one embodiment, a host can be considered "new" if the host has been registered with the reservation system 15 or has a property listing 77 with the reservation system 15 for less than a preselected time period (e.g., 3 months). In other embodiments, different criteria (e.g., number of reservations) or combinations of criteria can be used to determine if a host is a "new" host. If the host is not a new host (i.e., the host is an experienced host with the reservation system 15), the process proceeds to determine if the host needs a reminder to update the calendars 75 maintained by the host (step 404). In one embodiment, the process of FIG. 5, as described detail below, can be used to determine if a host needs a reminder to update calendars 75 maintained by the host. However, other techniques to determine if the host needs a reminder to update his or her calendar can be used in other embodiments. If the host does not need a reminder in step 404, the process can end and the host can be reevaluated for a reminder at the next interval to execute the process of FIG. 4.

If the host does needs a reminder in step 404 or if the host is a new host in step 402, the process proceeds to generate a calendar reminder for the host to update his or her calendars 75 (step 406). The reminder module 51 can generate a calendar reminder for each host that has been determined to need a calendar reminder. The calendar reminder can identify the property listing(s) having the calendar(s) that should be updated and provide other information (e.g., days since last update) to the host. In one embodiment, the reminder module 51 can generate a calendar reminder that is customized for the particular circumstances of the host. For example, a new host may receive information in the calendar reminder stressing the importance of maintaining an updated calendar 75, while an experienced host may receive information in the calendar reminder notifying the host of possible consequences for having an out-of-date calendar 75. In other embodiments, the reminder module 51 may generate the calendar reminder from one or more predetermined templates or versions. The predetermined template or version for the calendar reminder may be selected by the reminder module 51 based on specific criteria associated with the host (e.g., new host vs. experienced host, number of reminders that have been sent to the host or number of property listings maintained by the host).

After generating the calendar reminders for the hosts, the process can then determine if a host has recently accessed and updated his or her calendar(s) (step 408). Since the generation of calendar reminders may take time (e.g., several hours or more in some embodiments), the process confirms that a host did not update his or her calendars 75 during the time period that the calendar reminders were being generated in step 406. In one embodiment, a streaming process executed by the reminder module 51 can collect calendar view impressions from the hosts for a predetermined time period (e.g., the past 24 hours) after completing the generation of the calendar reminders.

In other embodiments, the streaming process can be used to monitor other types of user activities to determine whether a user has performed the activity being monitored within in a preselected time frame. If the streaming process indicates that the user has not performed the activity within the preselected time frame, the user can be contacted to request that the user perform the monitored activity. However, if the streaming process indicates that the user has recently performed the activity (i.e., the activity was performed within the preselected time frame), an indication or notification can be provided by the corresponding system to prevent the user from being contacted about performing the monitored activity.

For example, a sales team may be used to contact potential hosts about listing a property with the reservation system. The sales team may use a previously generated list of potential hosts when contacting those potential hosts. The streaming process can be used to monitor new property listings in the reservation system in real time after the list of potential hosts has been generated. The streaming process can identify the hosts associated with the new property listings and compare the identified hosts with the previously generated list of potential hosts. If the streaming process identifies a host on the previously generated list of potential hosts that has recently completed a new property listing, the streaming process can remove the host from the previously generated list and/or send a notification to the sales team regarding the identified host such that the sales team does not contact the identified host since he or she has recently created a property listing.

Referring back to the process of FIG. 4, if a host accessed his or her calendar 75 during step 406, then the process cancels the calendar reminder for that host (step 410) and the process ends. If the host did not access his or her calendar 75 during step 406, then the process sends the calendar reminder to the host (step 412) and the process ends. In one embodiment, the calendar reminders can be sent to the host by email, but other forms of communication (e.g., phone message, text message, push notification, etc.) can be used to send the reminder to the host.

Figure 6:
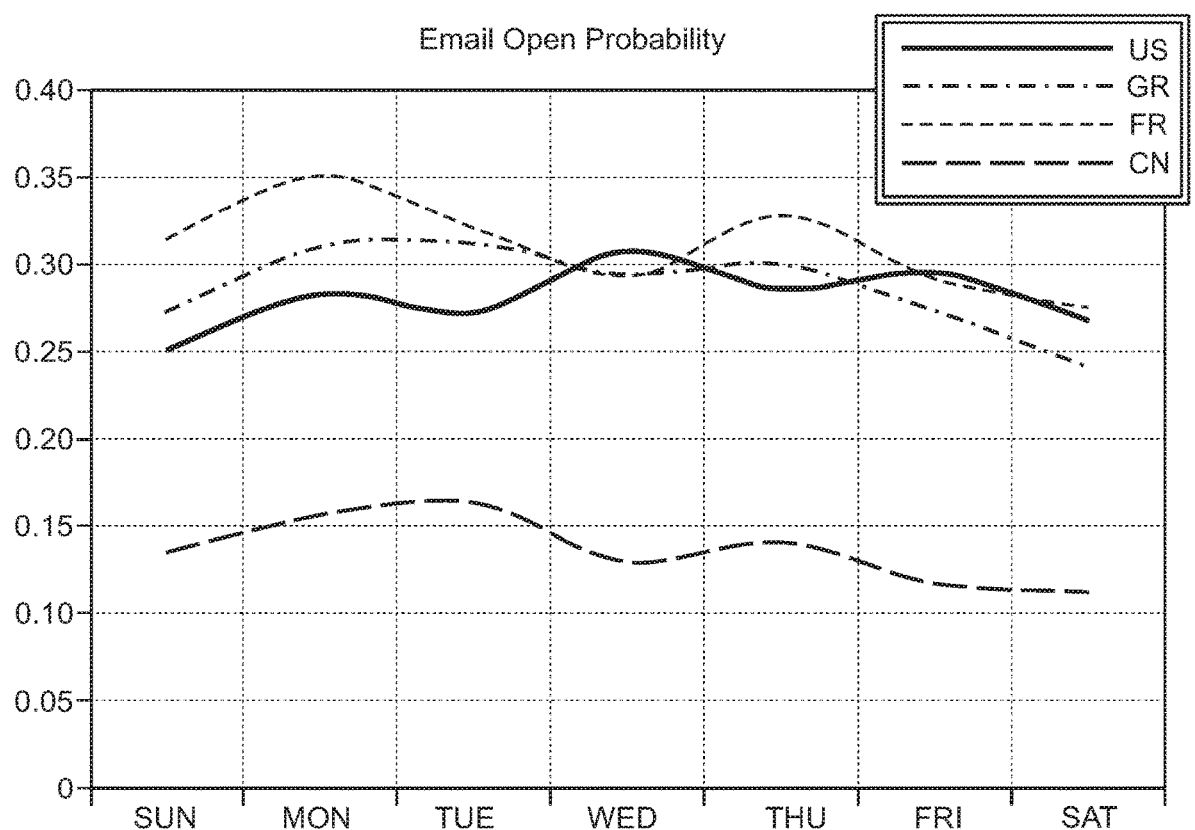
FIG. 6 is a graph showing an exemplary relationship between email open probability and day of the week in different countries in accordance with some embodiments of the present disclosure.
Figure 7:
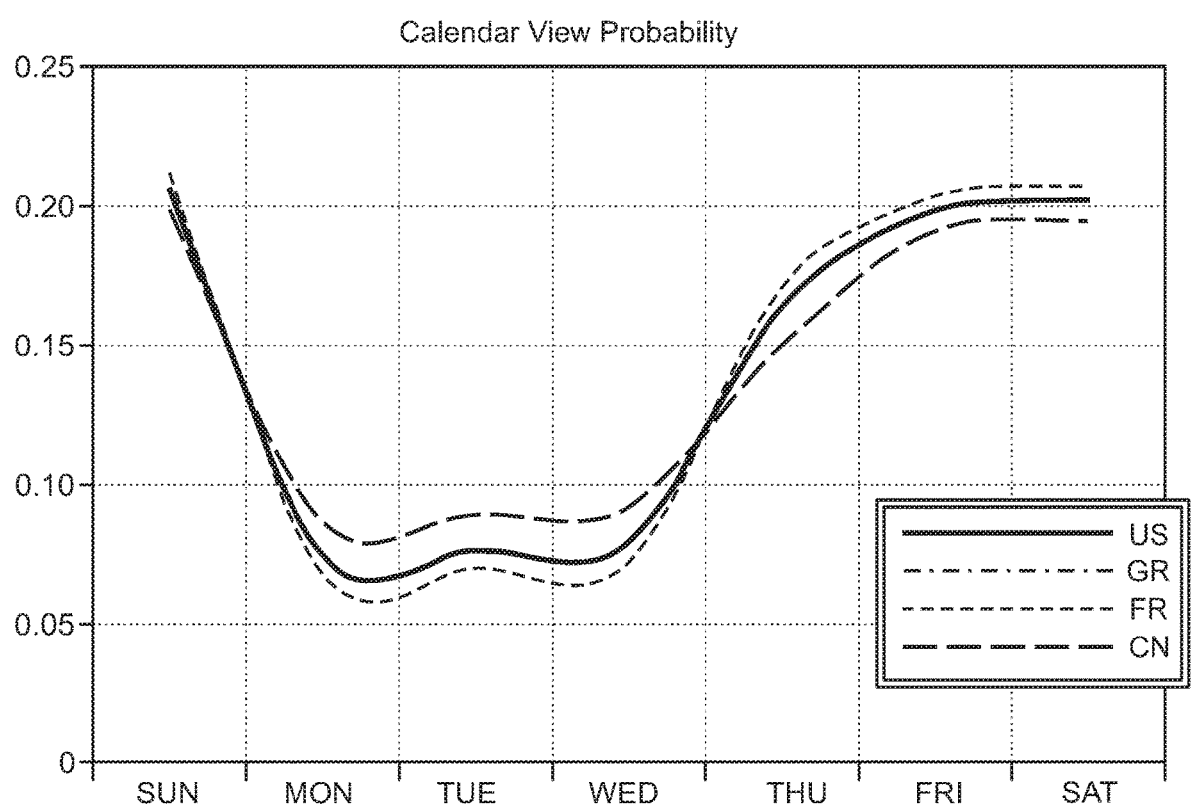
FIG. 7 is a graph showing an exemplary relationship between calendar view probability and day of the week in different countries in accordance with some embodiments of the present disclosure.
Figure 8:
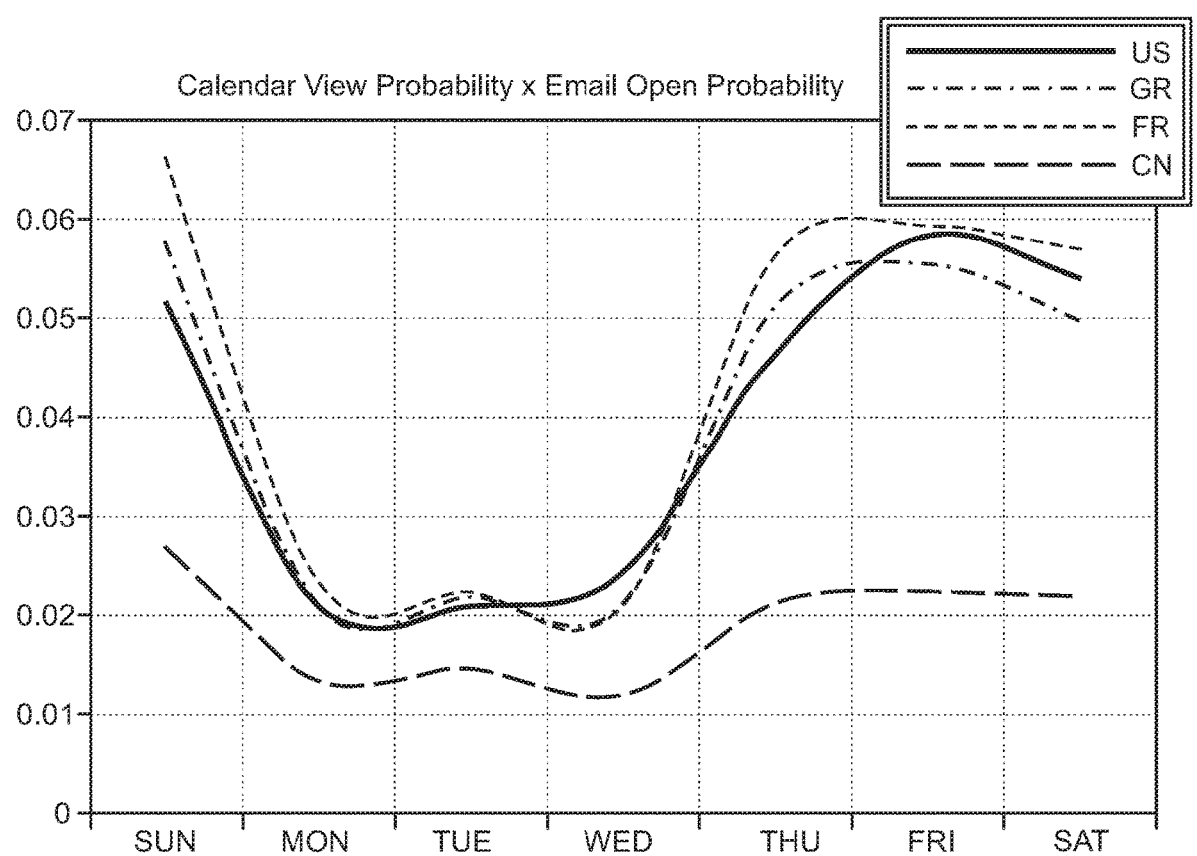
FIG. 8 is a graph showing an exemplary relationship between the combined email open probability and the calendar view probability for different countries with respect to day of the week in accordance with some embodiments of the present disclosure.

In one embodiment, the calendar reminders can be sent at a preselected time during the predetermined interval being used in the process of FIG. 4. The preselected time for sending reminders can be the time that corresponds to the highest likelihood that a host will read a calendar reminder and access the calendars 75 in response to receiving the reminder. In one embodiment, the time that has the highest likelihood that a host will read a calendar reminder and access the calendar 75 can be determined by combining the probability that a host will open an email with a calendar reminder (as shown in the graph of FIG. 6) with the probability that a host will view their calendar (as shown in the graph of FIG. 7). FIG. 8 shows a graph of an exemplary probability that a host will open an email with a calendar reminder and access their calendar on each day of the week. As can be seen in FIG. 8, many hosts are likely to open a calendar reminder and check their calendars near the weekend, such as on Friday, Saturday or Sunday (with the highest probability being on Sunday), when they tend to be less busy. If the predetermined interval is a weekly interval, then the preselected day of the week to send reminders can be Sunday (based on FIG. 8) or other day or time period when users are more likely to update calendar so as to increase the likelihood that a reminder will be sent when the host is willing to check his or her calendars 75. However, in other embodiments, other information can be used to determine the preselected time to send a reminder to the host.

In another embodiment, the determination of whether a host should receive a calendar reminder may be based on the interactions of the hosts with their respective calendars 75. In this regard, calendar logic 40 may track host interactions with their calendars 75 over time, such as determining and logging (e.g., recording the time and date) each time the host accesses his or her respective calendar 75. Based on such interactions, the calendar logic 40 may determine an expected time interval or time frame for when the host is expected to access his or her calendar 75.

As an example, the calendar logic 40 may determine an average time between calendar accesses for the host over a given time period (e.g., within the last few months or other time period), and then determine an expected time interval for the host to check his or her calendar 75 based on such average. For example, the expected time interval may be defined to be an amount of time (t) since the host last accessed his or her calendar 75, where t is based on the calculated average. In such example, t may be equal to the average or some multiple or ratio of the average. If the host fails to access his or her calendar 75 with the expected time interval, the calendar logic 40 may be configured to initiate a calendar reminder. Note that there are various techniques that may be used to determine the interval of when to expect the host to access his or her calendar 75 and/or when to send a calendar reminder to a host. Exemplary techniques will be described in detail below.

Figure 5:
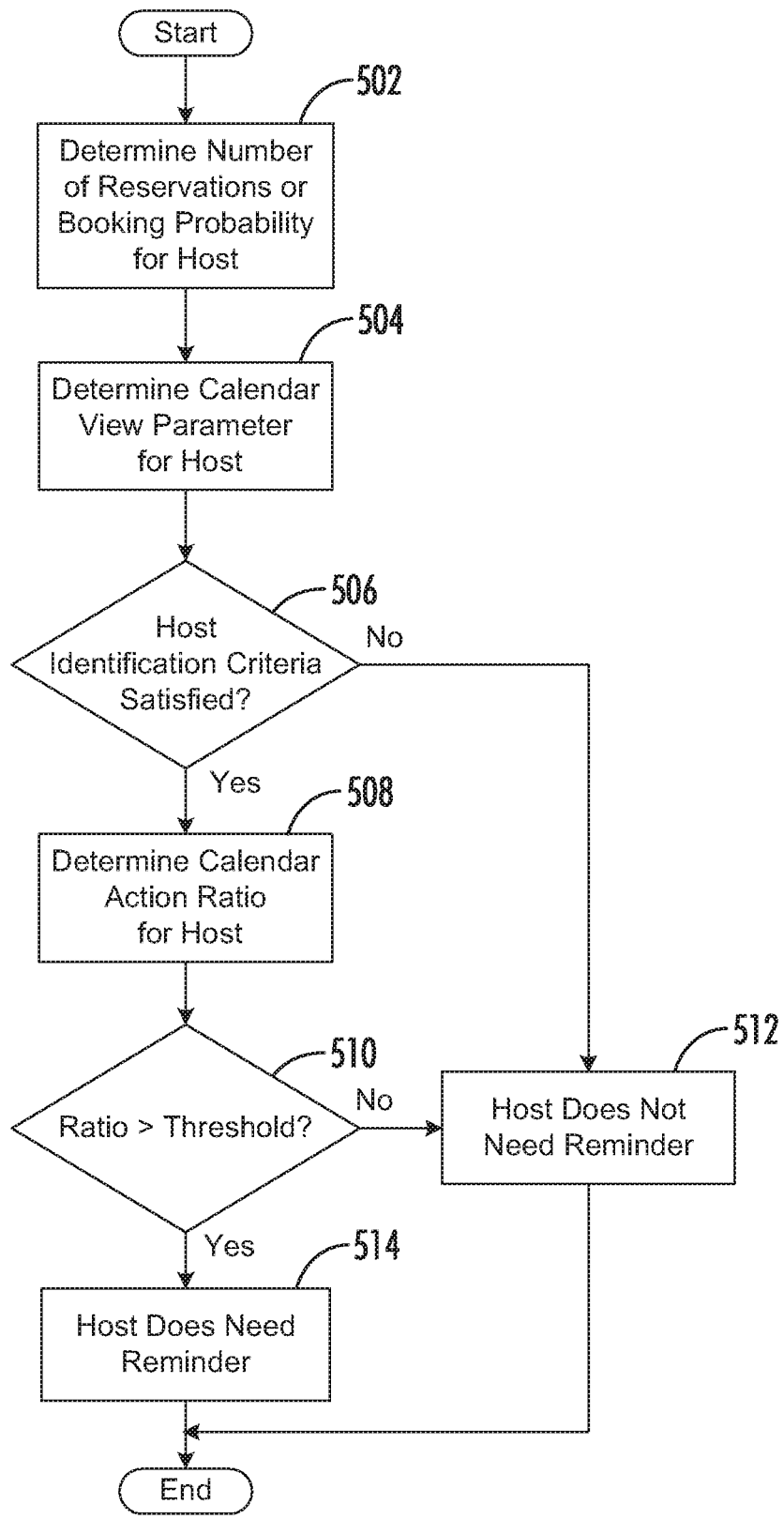
FIG. 5 is a flow chart illustrating a method for determining if a host needs a calendar reminder in accordance with some embodiments of the present disclosure.

FIG. 5 shows an embodiment of a process for selecting hosts to receive a reminder to update their calendars 75. In one embodiment, the process of FIG. 5 can be used to select hosts for reminders as set forth in step 404 of the process of FIG. 4. The operations depicted and described in FIG. 5 may be automatically completed by the reminder module 51 and/or the calendar logic 40 using the host access data 52 or other information stored in memory 61. It will be understood that the steps of FIG. 5 are provided as exemplary steps, and that one or more steps may be removed or added, and that the order of steps may be modified.

The process begins by determining the number of reservations in a calendar 75, within a predetermined time period, for a property listing 77 of the host or, if there are no reservations for the property listing 77, determining a booking probability, during a predetermined time period in the future, for the property listing of the host (step 502). In one embodiment, the predetermined time period to check for reservations can be 60 days, but shorter or longer time periods can be used in other embodiments. In another embodiment, the predetermined time period in the future to determine a booking probability can be 60 days, but shorter or longer time periods can be used in other embodiments. In a further embodiment, the predetermined time period associated with reservations and the predetermined time period associated with booking probability can be the same time period, but the time periods may be different in other embodiments.

Next, a calendar view parameter is determined for the host (step 504). The calendar view parameter can correspond to the expected number of times that the host will review his or her calendars 75 during a predetermined time period in the future. In one embodiment, the predetermined time period in the future for expected calendar views can be 60 days, but shorter or longer time periods can be used in other embodiments. In another embodiment, since the number of expected calendar views can vary greatly between hosts, the determination of the calendar view parameter can be adjusted to account for such differences. In one embodiment, the calendar view parameter (CVP) for a host can be determined as shown in Equation 1:

$$CVP = 1 - e^{-\frac{v}{median(v)}} \quad (1)$$

where v is the number of expected calendar views for the host, and median(v) is the median of the number of expected calendar views for all hosts.

Figure 9:
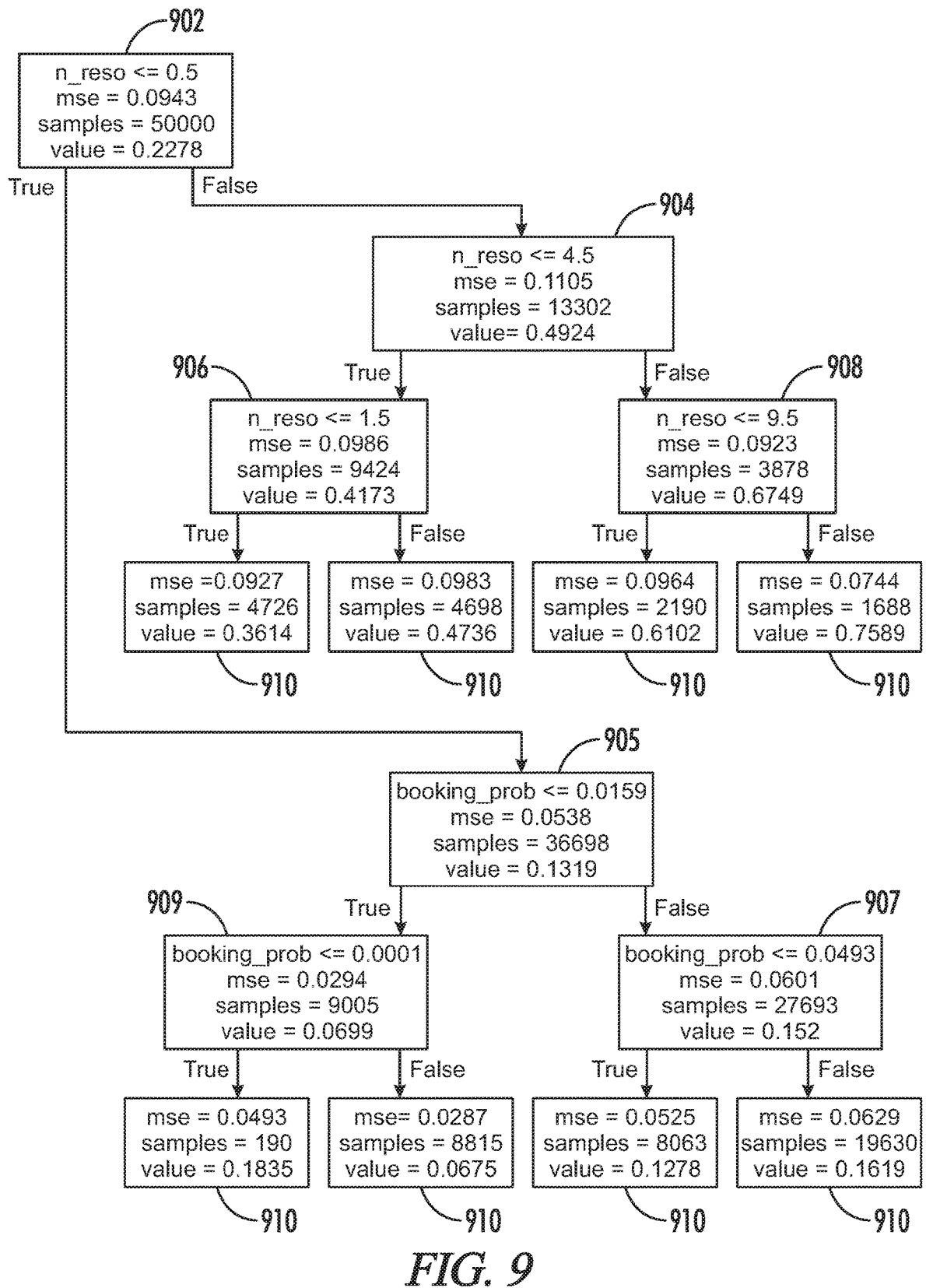
FIG. 9 is a block diagram illustrating an exemplary decision tree machine learning model for determining if a host should receive a calendar reminder in accordance with some embodiments of the present disclosure.

The process then analyzes the number of reservations or booking probability for the host and the calendar view parameter for the host to determine if a predetermined set of host identification criteria are satisfied (step 506). In one embodiment, the process can compare the calendar view parameter to a predetermined threshold value obtained from parsing a decision tree machine learning model to determine if the host identification criteria are satisfied. FIG. 9 show an exemplary embodiment of a decision tree machine learning model that can be used to determine the predetermined threshold value for evaluating if the host identification criteria are satisfied. The decision tree machine learning model can make an initial determination as to whether the host has accepted one or more reservations from guests in block 902. If the host has accepted a reservation, subsequent determinations regarding the number of reservations accepted by the host are made in blocks 904, 906 and 908, depending on the actual number of reservations for the host. For example, in block 906, the decision tree machine learning model can determine if the host has accepted one reservation or more than one reservation. If the host has not accepted a reservation, the decision tree machine learning model can determine a booking probability for the host. The decision tree machine learning model can then use the determined booking probability to make subsequent evaluations of the booking probability for the host in steps 905, 907 and 909, depending on the actual booking probability for the host. For example, in block 907, the decision tree machine learning model can determine if the booking probability for the host is less than or equal to 0.0493 or greater than 0.0493.

After the decision tree machine learning model parses through blocks 902-909 using the number of reservations for the host and/or the booking probability for the host, the decision tree machine learning model can reach determination blocks 910. Each determination block 910 in the decision tree machine learning model corresponds to the end of a particular path traveled in the decision tree machine learning model based on the results of evaluations completed in blocks 902-909. Each of the determination blocks 910 has a corresponding predetermined threshold value (identified as the value parameter in FIG. 9) that can then be compared to the calendar view parameter to determine if the host identification criteria are satisfied. As shown in the decision tree machine learning model of FIG. 9, the predetermined set of host identification criteria can have different calendar view parameter thresholds (i.e., the value parameters in determination blocks 910) based on the number of reservations or booking probabilities for the host.

In one embodiment, the decision tree machine learning model can be continuously trained or updated as new data is received regarding the maximum booking probability for hosts in the next 60 days and the number of reservations for hosts in the past 60 days in order to continuously update the value parameters (or the calendar view parameter thresholds) in determination blocks 910. By continuously updating the value parameters in determination blocks 910, the decision tree machine learning model can continuously be optimized to provide a more effective assessment of when a host may need a reminder. In an embodiment, an error factor (e.g., the mse parameter identified in FIG. 9) can be used to adjust calendar view parameter thresholds (i.e., the value parameters in FIG. 9) to account for variances in the determination of the expected number of calendar views in the future. In one embodiment, the mse parameter in FIG. 9 can be a mean square error value, but other types of error values may be used in other embodiments. In addition, the training process for the decision tree machine learning model is attempting to minimize the value of the error factor (e.g., the mse parameter identified in FIG. 9) in order to obtain a more accurate value parameter in the determination blocks 910.

If the host identification criteria is not satisfied in step 506 (i.e., the CVP threshold for the number of reservations or booking probability is not satisfied), then the host is determined to not need a reminder (step 512) and the process ends. However, if the host criteria are satisfied in step 506, then a calendar action ratio is determined for the host (step 508). In one embodiment, the probability of a host's calendar action can follow the distribution in Equation 2:

$$Pr(\text{Calendar Action} > t) = e^{-\frac{t}{\tau}} \quad (2)$$

where t is the number of days from a previous calendar action and τ is the average interval between two adjacent calendar actions.

In one embodiment, the calendar action ratio (CAR) can be determined as shown in Equation 3:

$$CAR = \frac{\text{number of days since the last calendar action by host}}{\text{average calendar action interval for host}} \quad (3)$$

where the average calendar action interval for the host is the average of the number of days between two consecutive calendar actions (referred to as a calendar action interval) for all calendar actions within a predetermined time period. For example, if a host typically looks at their calendar every 5 days and he/she hasn't looked at their calendar for 15 days, it is very likely that the calendar is outdated.

Figure 10:
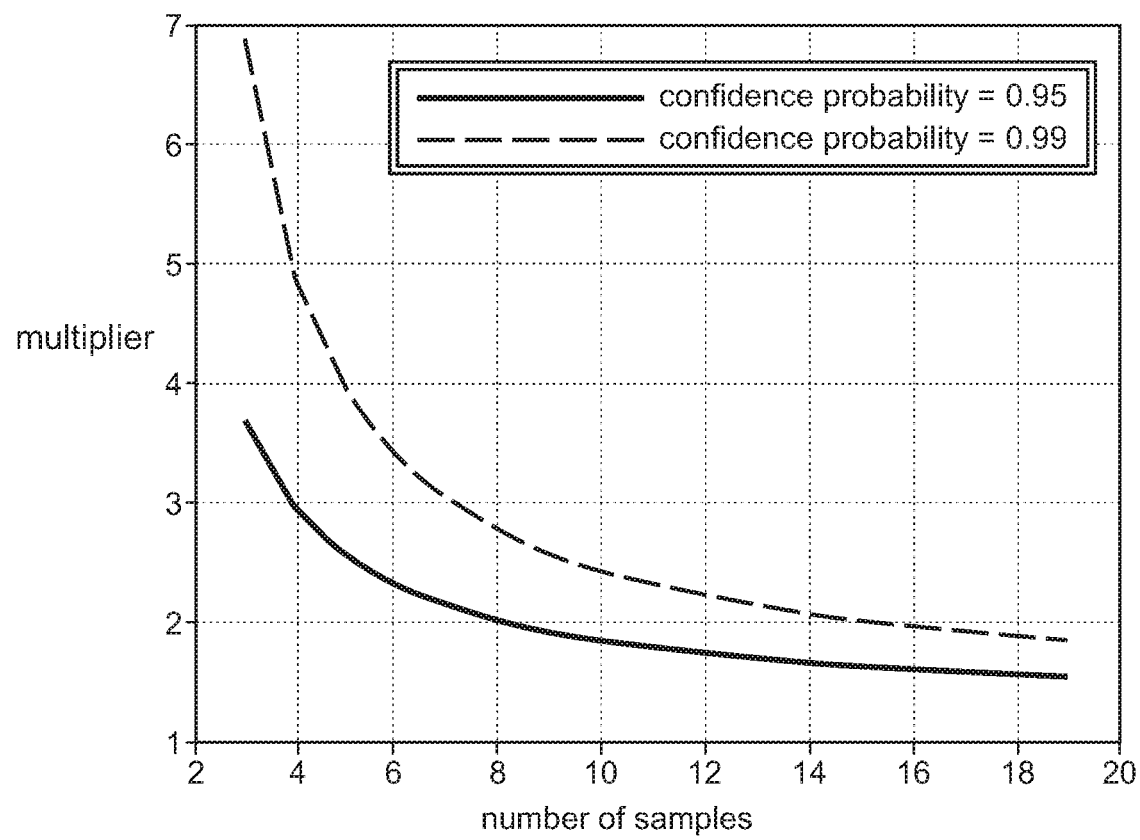
FIG. 10 is a graph showing an exemplary relationship between an average calendar action interval multiplier and the number of samples for different confidence probabilities in accordance with some embodiments of the present disclosure.

In one embodiment, when the average calendar action interval is based on a few samples, the average determination may not be reliable. To address the reliability concern, the average determination may be adjusted by a multiplier that is based on the number of samples. FIG. 10 shows an embodiment of a graph that can be used to determine the multiplier for different confidence probabilities based on the number of samples. As the number of samples (or calendar action intervals) increases, the use of the multiplier may not be needed.

Once the calendar action ratio is determined for the host, the calendar action ratio can be compared to a predetermined threshold (step 510). The predetermined threshold can be selected to achieve a desired goal, such as maximizing revenue, as described in more detail below, and can be 3 in one embodiment. The predetermined threshold may be greater or less than 3 in other embodiments depending on the goal to be achieved. In another embodiment, the predetermined threshold may be scaled by a scaling factor that is based on the number of calendar actions or the number of time periods between two consecutive calendar actions (also referred to as calendar action intervals) for the host. If the calendar action ratio is not greater than the threshold, the host does not need a reminder (step 512) and the process ends. However, if the calendar action ratio is greater than the threshold, then the host is determined to need a reminder (step 514) and the process ends.

Figure 11:
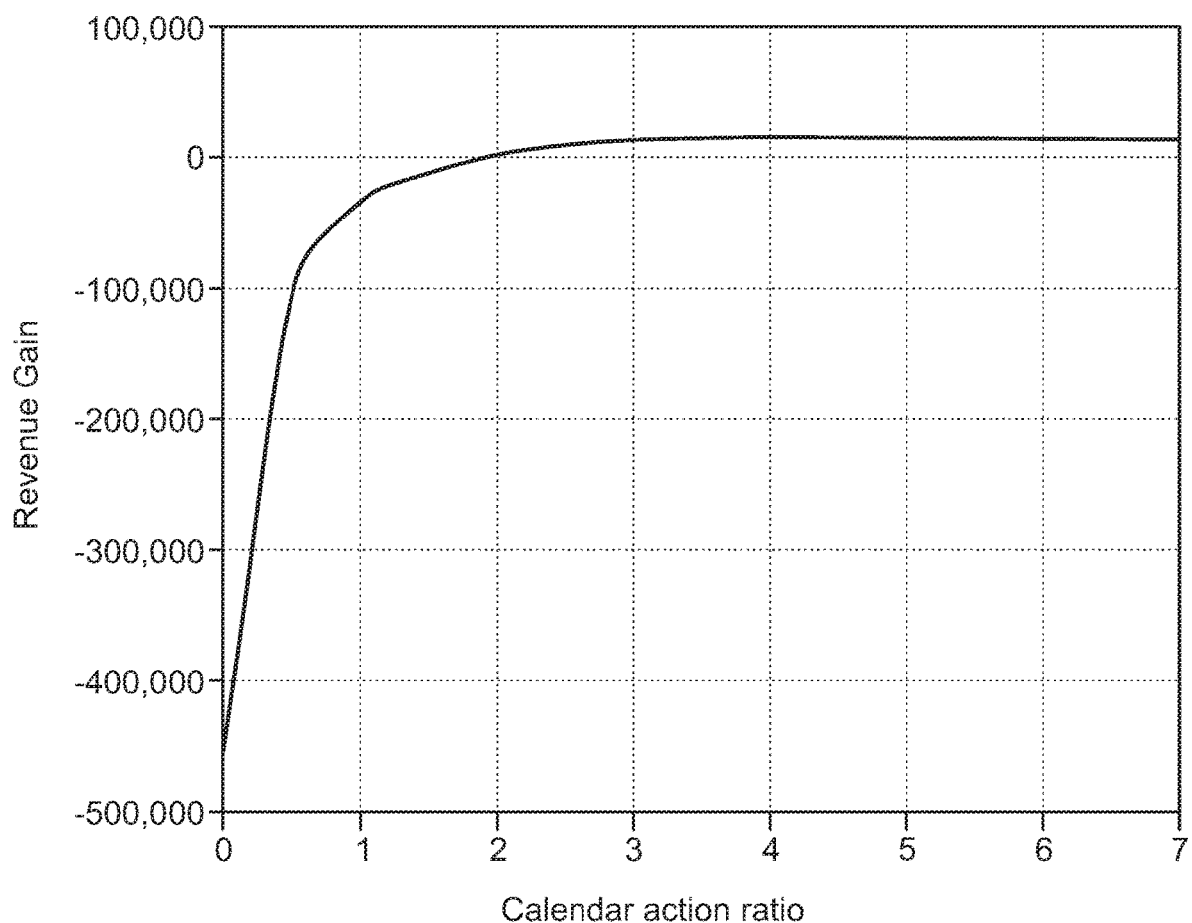
FIG. 11 is a graph showing an exemplary relationship between revenue gain and calendar action ratio in accordance with some embodiments of the present disclosure.
Figure 12:
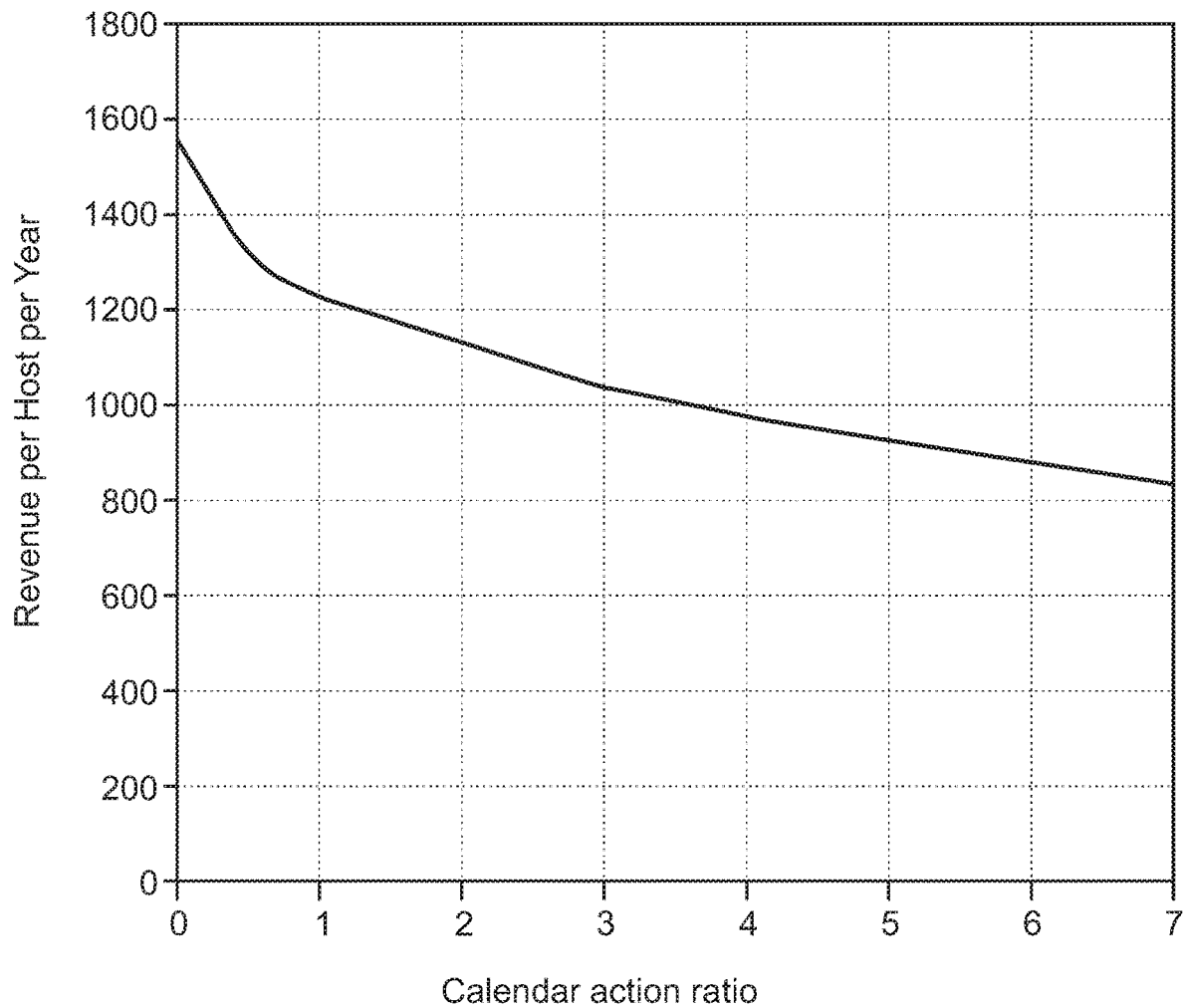
FIG. 12 is a graph showing an exemplary relationship between yearly host revenue and calendar action ratio in accordance with some embodiments of the present disclosure.

In one embodiment, the predetermined threshold for the calendar action ratio can be selected in an attempt to maximize revenue. The selection of the predetermined threshold can be used to maximize revenue by balancing potential increases and decreases in revenue that may result from the sending of calendar reminders. As shown in FIG. 11, there is an increase in revenue gain as the calendar action ratio approaches 3 and then the revenue gain levels off. In contrast, as shown in FIG. 12, yearly host revenue can decrease as the calendar action ratio increases. The balancing of the revenue information from FIGS. 11 and 12 can be used to determine the calendar action ratio threshold. For example, sending calendar reminders can generate increased revenue from a reduction in the number of cancelled reservations due to up-to-date calendars resulting from the guests responding to the reminders but, sending reminders can also decrease revenue from an increase in cancelled reservations due to out-of-date calendars resulting from hosts that elect to not receive reminders because of receiving excessive reminders. However, in other embodiments, the selection of the predetermined threshold for the calendar action ratio can be based on other factors besides revenue.

In one embodiment, the sending of calendar reminders to hosts in accordance with the processes of FIGS. 4 and 5 was implemented in an existing reservation system. The inclusion of the ability to send of calendar reminders to hosts was able to improve both the ratio of bookings made as a host that become cancelled by the host and the ratio of instant booking reservations made as a host that become cancelled by the host over the corresponding ratios that were obtained when using the reservation system without the capability of sending of calendar reminders. The improvement in the ratios of cancelled booking can result in an overall increase in bookings due to the fact that there are fewer cancellations.

In various embodiments described above, techniques are implemented for determining when to automatically provide a calendar reminder to a host based on the calendar viewing tendencies of the host. However, in other embodiments, the techniques for determining when to send a reminder to a user can be used by other types of systems or applications that involve the user's interaction with the system or application. The user's interactions with the system or application can be monitored and an expected time frame for a user interaction with the system or application can be generated. The system or application can then use the generated expected time frame and the user's last interaction with the system or application to determine when to send a reminder to the user similar to the techniques described above for sending contextual calendar reminder. For example, if the user has not interacted with the system or application within the expected time frame, the system or application can then determine to send the user a reminder. In other embodiments, the determination to send a reminder can be based on other factors, such as the information provided by the user during the user's interaction with the system or application, in addition to the user's last interaction with the system or application.

In one example, a user could enter information about a user's workout into a fitness application. The fitness application can track the workout information entered by the user and the frequency with which the user enters the workout information. If the user regularly provides workout information on select days (e.g., Monday, Wednesday, and Friday) or at a predetermined interval (e.g., every other day), the fitness application can expect the user to provide workout information according to the expected schedule. For example, if the user does not access the fitness application for more than a week (or some other period) after regularly accessing the fitness application as described above, the fitness application can determine that the user requires a reminder. However, if the user provided information indicating that the user suffered an injury, the fitness application may alter the determination to send a reminder since the user would be unable to workout on the regular schedule. In yet other examples, other types of reminders may be communicated as may be desired.

Embodiments within the scope of the present disclosure include program products with machine-readable media for carrying or having machine-executable instructions or data structures stored thereon. Machine-readable media can be any available non-transitory media that can be accessed by a general purpose or special purpose computer or other machine with a processor. By way of example, machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Combinations of the above are also included within the scope of machine-readable media. Machine-executable instructions include, for example, instructions and data which cause a general purpose computer, special purpose computer, or special purpose processing machine to perform a certain function or group of functions. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present disclosure. Accordingly, the present disclosure is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A system for optimizing timing of automated calendar update reminders, comprising:
    memory for storing a calendar for a property listing maintained by a host; and
    at least one processor configured to receive reservation requests for the property listing, each of the reservation requests indicating a reservation for the property listing, wherein the at least one processor is configured to update the calendar for the property listing to indicate a reservation time for the reservation indicated by the respective reservation request, the at least one processor further configured to:
        create a sample data set of host interactions by a plurality of hosts with a plurality of calendars, wherein the sample data set of host interactions includes data regarding: a frequency of interactions by the plurality of hosts with the plurality of calendars, when interactions by the plurality of hosts with the plurality of calendars occur and an amount of the plurality of calendars updated by the plurality of hosts during interactions;
        train a machine learning model with the sample data set of host interactions to generate a plurality of threshold vales, wherein each threshold value of the plurality of threshold values corresponds to a host identification criteria;
        calculate a calendar view parameter for the host, wherein the calendar view parameter corresponds to an expected number of times that the host reviews the calendar in a predetermined time period;
        determine, using the machine learning model, a threshold value of the plurality of threshold values for the calendar view parameter based on an input to the machine learning model of one of a number of reservations accepted by the host or a booking probability for the host, wherein the input to the machine learning model satisfies the host identification criteria for the determined threshold value;
        compare the calendar view parameter to the determined threshold value;
        automatically generate a calendar update reminder for the host based on the comparison; and
        send the generated calendar update reminder to the host.

2. The system of claim 1, wherein the host is a first host and the at least one processor is configured to determine if a second host has a second property listing stored in memory for less than a predetermined time period and send a calendar update reminder to the second host in response to a determination that the second property listing is stored in memory for less than the predetermined time period.

3. The system of claim 2, wherein the at least one processor is configured to send a calendar update reminder to the second host at a predetermined interval.

4. The system of claim 1, wherein the at least one processor is configured to:
    track when the host accesses the calendar to determine a first parameter indicative of an expected time frame for the host to access the calendar for the property listing and a second parameter indicative of when the host last updated the calendar for the property listing;
    determine a ratio of the first parameter and the second parameter; and
    send the calendar update reminder in response to a comparison of the ratio and a predetermined value.

5. The system of claim 4, wherein the first parameter is based on an average number of days for the host to access the calendar.

6. The system of claim 5, wherein the at least one processor is configured to combine the first parameter with a predetermined factor.

7. The system of claim 1, wherein the at least one processor is configured to continuously train the machine learning model as new host interactions with calendars are received.

8. The system of claim 1, wherein the at least one processor is configured to adjust the determined threshold value by an error factor.

9. The system of claim 1, wherein the calendar view parameter is adjusted in view of a median number of expected calendar views for property listings by a plurality of hosts.

10. The system of claim 1, wherein the at least one processor is configured to determine if the host accessed the calendar within a predetermined time period prior to the generation of the calendar update reminder and to cancel the sending of the calendar update reminder in response to the determination that the host accessed the calendar within the predetermined time period.

11. The system of claim 1, wherein the at least one processor is configured to customize the calendar update reminder for the host.

12. A method for sending a reminder to a host to update a calendar for a property listing maintained by the host, comprising:
    creating a sample data set of host interactions by a plurality of hosts with a plurality of calendars, wherein the sample data set of host interactions includes data regarding: a frequency of interactions by the plurality of hosts with the plurality of calendars, when interactions by the plurality of hosts with the plurality of calendars occur and an amount of the plurality of calendars updated by the plurality of hosts during interactions;

training a machine learning model with the sample data set of host interactions to generate a plurality of threshold vales, wherein each threshold value of the plurality of threshold values corresponds to a host identification criteria;

calculating a calendar view parameter for the host, wherein the calendar view parameter corresponds to an expected number of times that the host reviews the calendar in a predetermined time period;

determining, using the machine learning model, a threshold value of the plurality of threshold values for the calendar view parameter based on an input to the machine learning model of one of a number of reservations accepted by the host or a booking probability for the host, wherein the input to the machine learning model satisfies the host identification criteria for the determined threshold value;

comparing the calendar view parameter to the determined threshold value;

generating the reminder for the host in response to the comparing; and sending the generated reminder to the host.

13. The method of claim 12, further comprising identifying a second host to receive a second reminder to update a calendar for a second property listing maintained by the second host in response to a determination that the second host has maintained the second property listing less than a predetermined time period.

14. The method of claim 13, further comprising sending the second reminder to the second host at a predetermined interval.

15. The method of claim 12, further comprising:
tracking when a host accesses a calendar for a property listing maintained by the host;

determining a first parameter indicative of an expected time frame for the host to access the calendar based on the tracked accesses of the calendar by the host;

determining a second parameter indicative of when the host last updated the calendar for the property listing based on the most recent access of the calendar by the host in the tracked accesses of the calendar by the host;

forming a ratio of the first parameter and the second parameter; and wherein sending the generated reminder to the host includes sending the calendar update reminder in response to a comparison of the ratio and a predetermined value.

16. The method of claim 12, further comprising continuously training the machine learning model as new host interactions with calendars are received.

17. The method of claim 12, wherein the determining the threshold value includes adjusting the determined threshold value by an error factor.

18. The method of claim 15, wherein the first parameter is based on an average number of days for the host to access the calendar.

19. The method of claim 12, further comprising:
determining if the host has updated the calendar for the property listing within a predetermined time period from the generating of the reminder;

cancelling the reminder for the host in response to a determination that the host updated the calendar; and sending the reminder to the host in response to a determination that the host did not update the calendar within the predetermined time period.

20. A non-transitory computer-readable medium storing a program executable by a microprocessor, the program comprising:
logic for creating a sample data set of host interactions by a plurality of hosts with a plurality of calendars, wherein the sample data set of host interactions includes data regarding: a frequency of interactions by the plurality of hosts with the plurality of calendars, when interactions by the plurality of hosts with the plurality of calendars occur and an amount of the plurality of calendars updated by the plurality of hosts during interactions;

logic for training a machine learning model with the sample data set of host interactions to generate a plurality of threshold vales, wherein each threshold value of the plurality of threshold values corresponds to a host identification criteria;

logic for calculating a calendar view parameter for the host, wherein the calendar view parameter corresponds to an expected number of times that the host reviews the calendar in a predetermined time period;

logic for determining, using the machine learning model, a threshold value of the plurality of threshold values for the calendar view parameter based on an input to the machine learning model of one of a number of reservations accepted by the host or a booking probability for the host, wherein the input to the machine learning model satisfies the host identification criteria for the determined threshold value;

logic for comparing the calendar view parameter to the determined threshold value;

logic for generating the reminder for the host in response to the comparing; and logic for sending the generated reminder to the host.

21. The computer-readable medium of claim 20, further comprising:
logic for determining if the host has updated the calendar for the property listing within a predetermined time period from the generating of the reminder;

logic for cancelling the reminder for the host in response to a determination that the host updated the calendar; and logic for sending the reminder to the host in response to a determination that the host did not update the calendar within the predetermined time period.

22. A system for optimizing timing of automated calendar update reminders, comprising:
memory for storing a calendar maintained by a user; and at least one processor configured to update the calendar to indicate event times for events tracked by the calendar, the at least one processor further configured to:
create a sample data set of user interactions by a plurality of users with a plurality of calendars, wherein the sample data set of user interactions includes data regarding: a frequency of interactions by the plurality of users with the plurality of calendars, when interactions by the plurality of users with the plurality of calendars occur and an amount of the plurality of calendars updated by the plurality of users during interactions;

train a machine learning model with the sample data set of user interactions to generate a plurality of threshold vales, wherein each threshold value of the plurality of threshold values corresponds to a user identification criteria;

calculate a calendar view parameter for the user, wherein the calendar view parameter corresponds to an expected number of times that the user reviews the calendar in a predetermined time period;

determine, using the machine learning model, a threshold value of the plurality of threshold values for the calendar view parameter based on an input to the machine learning model related to the events tracked by the calendar, wherein the input to the machine learning model satisfies the user identification criteria for the determined threshold value;

compare the calendar view parameter to the determined threshold value;

automatically generate a calendar update reminder for the user based on the comparison; and send the generated calendar update reminder to the user.

23. The system of claim 22, wherein the at least one processor is configured to:

track when the user accesses the calendar to determine a first parameter indicative of an expected time frame for the user to access the calendar and a second parameter indicative of when the user last updated the calendar;

determine a ratio of the first parameter and the second parameter; and send the calendar update reminder in response to a comparison of the ratio and a predetermined value.

24. The system of claim 22, wherein the at least one processor is configured to determine if the user accessed the calendar within a predetermined time period prior to a generation of the calendar update reminder and to cancel the sending of the calendar update reminder in response to the determination that the user accessed the calendar within the predetermined time period.

\* \* \* \* \*